Figure 1:
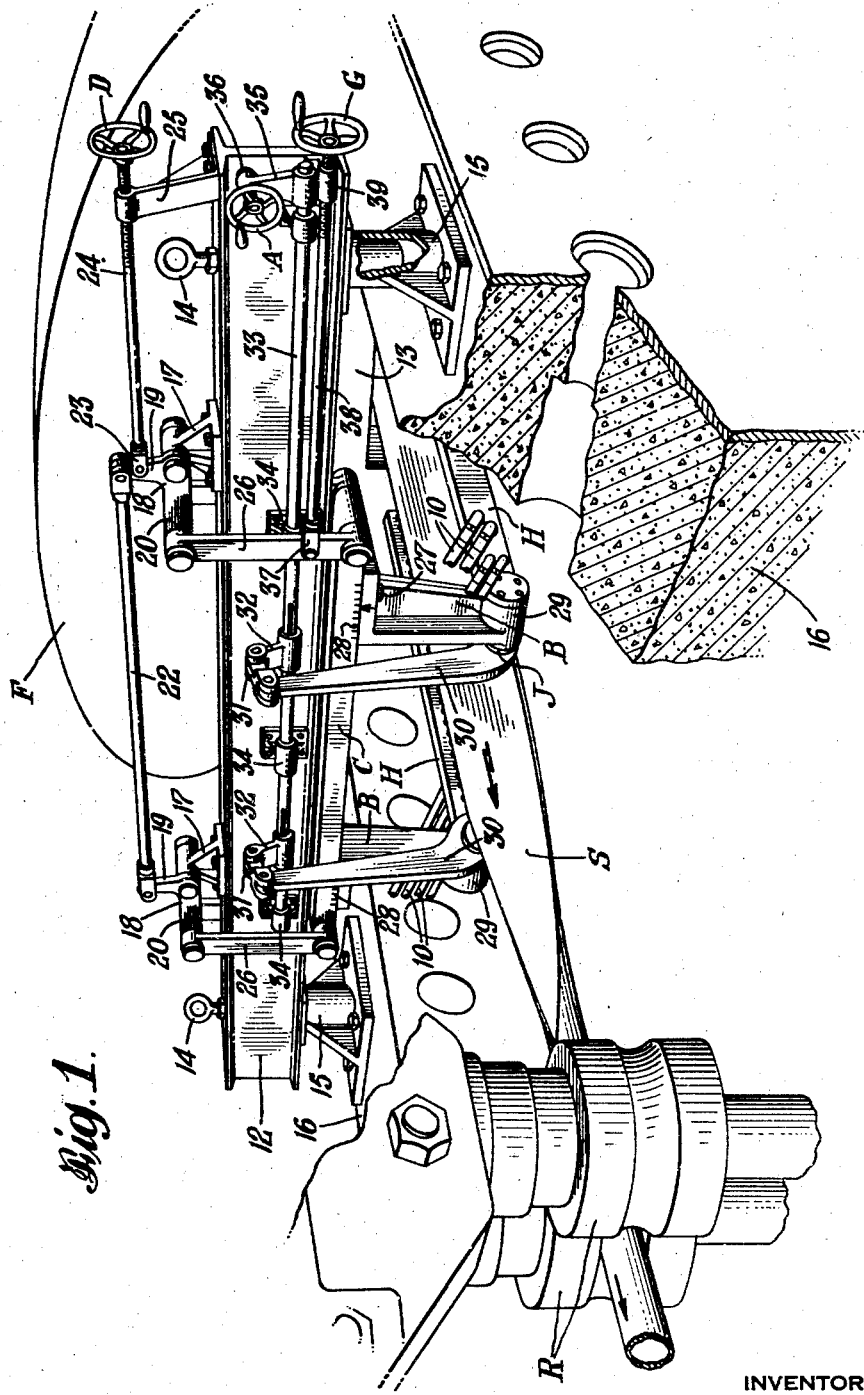

July 1, 1947. H. T. HERBST 2,423,188
SKELP EDGE WELDING
Filed Feb. 2, 1944 2 Sheets-Sheet 1

INVENTOR
HARRY T. HERBST
BY
ATTORNEY

Patented July 1, 1947

2,423,188

UNITED STATES PATENT OFFICE 2,423,188

SKELP EDGE WELDING

Harry T. Herbst, Baltimore, Md., assignor to Union Carbide and Carbon Corporation, a corporation of New York Application February 2, 1944, Serial No. 520,808

14 Claims. (Cl. 263—3)

This invention relates to skelp edge welding, and its purpose is to improve the quality of welds made in the manufacture of pipe or tubing, in which the heated skelp is passed to a set of forming rolls, which shape the skelp into circular form and press the edges of the heated skelp together, thus welding the same and producing the tube or pipe.

In continuous butt-welding mills for such pipe manufacture, the welding operation is improved by further heating the edges of the skelp as it comes from the furnace, to raise the temperature of the skelp edges to facilitate the welding operation effected by the rolls. This is accomplished by the installation of oppositely disposed oxy-acetylene heating heads for directing heating flames against the edges of the skelp at a station between the skelp heating furnace and the set of pipe or tube forming rolls. The present invention is particularly related to this installation of skelp edge heating heads.

The advantages of heating the skelp edges, and method and apparatus for this purpose, are fully set forth in Jones and Miller Patent No. 2,178,451, to which reference is made for details supplementary to the present disclosure.

The skelp passing through the process is of relatively thin flexible nature, and the temperatures involved in the process are such that the skelp may tend to sag or otherwise move so that the position of the path of the moving skelp, relative to the position of the heating heads, is displaced out of alignment for the proper effect of the oxy-acetylene flames on the skelp edges. Also, change in the temperature conditions of the furnaces, ambient air, or change in other conditions of the process may cause change in kind, degree, time or place of such displacement during the continuation of the process.

For example, after the process has been in satisfactory operation of a period of time, an increase in the temperature of the furnace may cause the skelp to sag, resulting in a displacement of the path of the moving skelp. The increased temperature of the furnace, and consequent sag of the skelp, may continue constant, so that the path of the moving skelp may continue stationary in its displaced position, for another indefinite interval, dependent upon the conditions of operation. Then the temperature or circulation of the ambient air, for example, may change, and cause a different displacement of the position of the path of the moving heated skelp.

It is therefore an important object of the present invention to provide means for adjusting the position of the heating heads into alignment with the position of the path of the moving heated skelp, while the skelp is in motion.

Provision has been made for locally adjusting the heating heads on a stationary support toward and away from each other, to adapt them for heating skelp of different widths. The width of the skelp is predetermined, and remains fairly constant in process, so that this local adjustment can be made before the process is started. Such local adjustment is not sufficient to cope with displacement of the position of the path of the skelp, and it would require shutting down the heating heads or furnaces or both, discontinuing the movement of the skelp, or stopping the entire process for access to the adjustment, in addition to a time interval for cooling to a temperature suitable for local manual adjustment. Furthermore, as hereinbefore explained, frequent adjustments may be required, resulting in repeated shut downs.

Further objects of the invention are therefore to provide adjustment of the heating heads relative to the position of the path of the moving heated skelp, which is operated by remote control from a point spaced from the heating heads and outside of the furnace, and operable to adjust the vertical height of the heating heads, the lateral position of the heating heads, and to tilt the heating heads.

Figure 2:
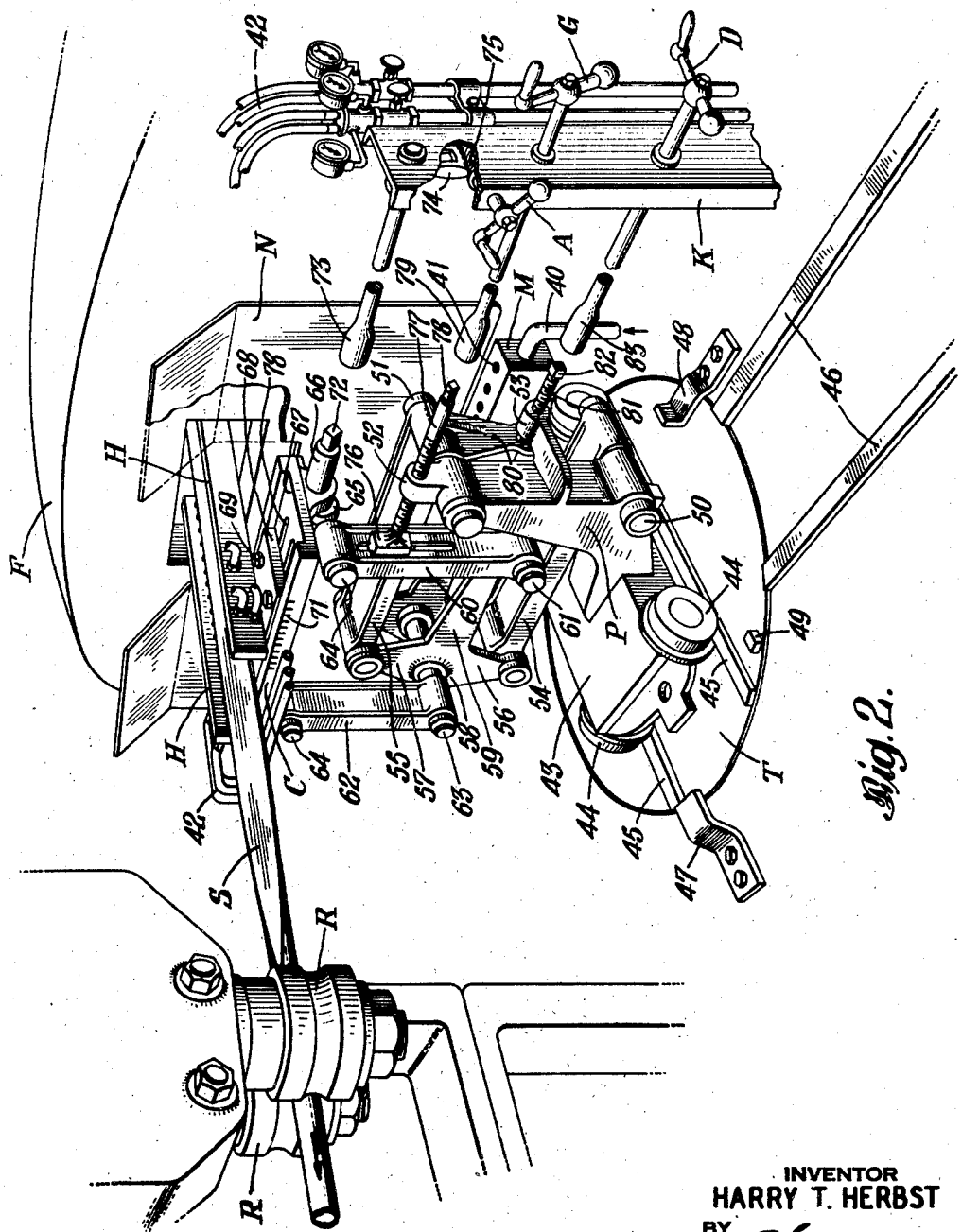

Other objects and features of novelty will become apparent as the following description proceeds, as taken in conjunction with the accompanying drawings, in which:

Fig. 1 is a perspective view of apparatus according to a preferred embodiment of the present invention, in which the heating heads are adjustably supported by an overhead support; and Fig. 2 is a perspective view of a modification in which the heating heads are adjustably supported by a pedestal on a turntable.

As shown in the drawings, the skelp S is heated in any suitable furnace F, which is generally a long furnace fired by either gas or oil, although other source of heat may be used. In passing through the furnace, the skelp is heated to approximately 2400° F. As the skelp leaves the furnace F, the edges of the skelp pass between oppositely disposed oxy-acetylene heating heads H, which project high-temperature heating flames thereagainst, thereby removing scale and causing a rise in temperature sufficient to produce a film of liquid steel. The skelp then passes continuously through rolls R which form and weld the pipe. The heating heads H may be of any suitable construction, such for example as that shown in the Jones and Miller patent hereinbefore referred to.

According to the present invention, the heating heads H are supported by a carriage C, on which brackets B are adjustable toward and away from each other, to set the heads for different skelp widths. The heads H are pivoted on journals J for tilting adjustment, through linkage operated by a handwheel A. The carriage C is movable vertically by linkage operated by a handwheel D, and is movable horizontally, transversely of the path of the skelp S, by a handwheel G.

The form of the invention illustrated in Fig. 1 comprises an over head support arrangement, from which the heating heads H depend. In this form relatively short heating heads are provided, located close to the furnace door. These heads are supplied with gases and cooling water by piping indicated generally at 10.

The overhead support is provided by a beam 12, which extends transversely above the path of the skelp S, closely adjacent to the furnace F, a bulkhead 13 being provided to protect the mechanism suspended from the beam 12, from the heat of the furnace F. The beam 12 is provided with a pair of eye bolts 14 by means of which the beam 12 and parts suspended thereby may be hoisted as a unit.

The ends of the beam 12 rest upon pedestals 15 mounted upon suitable masonry foundation 16, which may be a portion of the furnace wall. A similar set of pedestals may be provided at a position clear of the furnace, to receive the assembly for inspection, cleaning or repair.

A pair of bearing pads 17 are mounted on top of the beam 12, and have journaled therein respectively a pair of bell cranks 18, each having a vertical arm 19 and a horizontal arm 20. The vertical arms 19 are connected by a tie rod 22. One of the vertical arms 19 is connected by a swiveled clevis 23 to a screw 24 passing through a threaded bracket 25 mounted on the top flange of the beam 12. The handwheel D turns the screw 24, for moving the vertical arms 19 longitudinally of the beam, and thereby raising or lowering the horizontal arms 20.

Depending from the outer ends of the horizontal arms 20 are a pair of vertical links 26, having their upper ends pivoted to the outer ends of the arms 20, and their lower ends pivoted to the carriage C, so that the carriage is suspended by these links 26 from the outer ends of the horizontal arms 20, to be raised or lowered thereby when the handwheel D is turned.

The pair of brackets B is laterally adjustably secured to the underside of the carriage C, for example by bolts 27 passing through slots in the bracket or carriage and elongated in the direction transverse to the path of the skelp S. By this means the brackets B may be adjusted for different widths of the skelp, the adjustment being faciliated by graduations 28 on the bracket or carriage. The lower ends of the brackets B support bearings 29 for the journals J of the cranks 30 which carry the heating heads H, so that the brackets and the carriage as a unit are suspended from the ends of the horizontal arms 20.

The upper ends of the cranks 30 are connected by links 31 to arms 32 of a rock shaft 33 extending longitudinally of the beam 12 and journaled in bearings 34 mounted on the web of the beam 12. The rock shaft 33 has a crank arm 35 threadedly receiving a screw 36 bearing against the web of beam 12 and turned by the handwheel A, by means of which the heads H may be tilted about their journals J.

One of the vertical links 26 is connected by a swivel clevis 37 to a screw 38 threaded in a bracket 39 mounted on the beam 12, and turned by the handwheel G, by means of which the carriage C, brackets B, and heads H may be moved as a unit, transversely of the path of the skelp, swinging about the pivots at the outer ends of the horizontal bell crank arms 20.

In operation, after the brackets B have been adjusted on the carriage C by the bolts 27 for the width of skelp being treated, the welding process proceeds in the manner described in the Jones and Miller patent hereinbefore referred to, the skelp edges being additionally heated by the heads H to facilitate the operation. However, the thin, flexible nature of the skelp and the temperatures involved in the process, are such that the position of the skelp S between the heating heads H may vary during the process, and it is accordingly necessary to adjust the position of the heating heads H to direct the flames therefrom against the lateral edges of the skelp in its new position.

Accordingly, if the path of the skelp S is raised or lowered, the handwheel D is operated to turn the screw 24 in the bracket 25, which through the swivel clevis 23 engaging the bell crank arms 19 as tied together by the rod 22, will raise or lower the horizontal arms 20 and the vertical links 26 depending therefrom, thus raising or lowering the carriage C and accordingly raising or lowering the burner heads H, which are suspended from the carriage C by the brackets B and the journals J carried thereby.

If the path of the skelp becomes inclined to its original position, the handwheel A is operated to turn the screw 36 in the crank arm 35, thereby turning the rock shaft 33 and its arms 32, which through the links 31 turn the levers 30 about their journals J, and thus tilt the heating heads H into alignment with the inclined path of the skelp S.

If the part of the skelp S is shifted laterally, the handwheel G is operated to turn the screw 38 in the bracket 39, thus swinging the links 26 and thereby moving the carriage C transversely to the path of the skelp into alignment with the laterally shifted position thereof.

In the form of apparatus shown in Fig. 2, the supporting structure for the heating heads H and their carriage C comprises a pedestal P mounted on a turntable T. These are located close to the furnace F, and portions of the burner heads H project through the door of the furnace. To protect the mechanism carried by the pedestal P from the heat of the furnace, a shield or baffle N is mounted firmly therebetween, and cooled by an air blast from a manifold M, which receives air under pressure from a supply pipe 40 and projects the air blast in jets from a row of holes 41.

Although the burner heads H and the carriage C as supported by the pedestal P, all turn with the turntable T, the operating mechanisms are controlled from a permanent control column K, which also supports supply piping 42 for gases and cooling water for the heating heads H. The handwheels A, D, and G are mounted on this control column K and operate sockets which are adapted to register with polygonal ends of the operating shafts of the portable adjusting mechanisms.

The support for the pedestal P on the turntable T comprises a truck 43 having flanged wheels 44 rolling on track sections 45 mounted on the turntable T. Mounted on the floor of the mill are tracks 46, centered with the pivot of the turntable T, which is adapted to rotate to bring the track sections 45 into register with the tracks 46. A hold-down bracket 47 and a stop bracket 48 for the turntable are secured to the floor, and a lug 49 on the turntable is adapted to engage the stop bracket 48 to register the track sections 45 with the tracks 46.

The rigid pedestal P carried by the truck 43 comprises an upstanding member having bosses supporting stub shafts 50 and 51, and also provided with threaded bosses 52 and 53. Pivoted on the stub shafts 50 and 51 are upper and lower horizontal links 54 and 55. The other ends of the links 54 and 55 are pivoted to lower and upper arms 56 and 57 of a three-arm crank 58, the third arm 59 of which is pivoted to a vertical link 60 by means of a stub shaft 61. Another vertical link 62 is pivoted on a stub shaft 63 carried by the central portion of the three-arm lever 58.

The upper ends of the levers 60 and 62 have journaled therein shafts 64 carrying bearings 65 in which is journaled a shaft 66 rigid with the carriage C, which in this form is a channeled plate 67. Slides 68, laterally adjustable in the channel of the plate 67, carry the heating heads H. The slides 68 are secured in adjusted positions determined by the width of the skelp S, by means of bolts 69 passing through transversely elongated slots 78, and indicated by graduations 71.

The shaft 66 terminates in a polygonal end 72, adapted to receive a socket wrench 73 which is turned by a segment 74 meshing with a worm 75 turned by the handwheel A, for tilting the carriage C about the journal shaft 66.

The link 60 carries a slide 76 swiveled to a screw 77, threaded in the boss 52 on the pedestal P and terminating in a polygonal end 78 adapted to receive a socket 79 turned by the handwheel G for transverse movement of the carriage, swinging laterally on the shafts 61 and 63.

The horizontal link 55 has a crank arm 80 depending from the stub shaft 51, and engaged by a screw 81 threaded in the boss 53 of the pedestal P. The screw 81 has a polygonal end 82 adapted to receive a socket 83 turned by the lifting handwheel D. When the socket 83 is turned, the screw 81 moves for example inwardly, pushing the arm 80 about the pivot 51, thus tending to raise the lever 55 about the same pivot. This movement of the lever 55 through arm 57, shaft 63, and link 62, raises that end of the carriage C. At the same time, this lifting movement of the lever 55 through arm 57, arm 56 being fulcrumed at the end of link 54, raises the third arm lever 59, shaft 61 and link 60, thus raising the near end of the carriage C, the amounts of movement of the two ends of the carriage being equal. Reverse turning of the handwheel D reverses these movements and lowers the carriage.

While these two embodiments of the invention have been disclosed, other modifications will be readily apparent to those skilled in the art. For this reason, the invention is not to be limited to the details disclosed, but instead includes such embodiments of the broad idea as fall within the scope of the appended claims.

I claim:

1. In apparatus for manufacturing pipe or tubing, a support, a carriage, means for movably mounting said carriage on said support, a pair of oppositely disposed burners mounted on said carriage for heating the edges of skelp, means for adjusting said burners toward and away from each other for different widths of skelp, and remote control means connected to said carriage mounting means for adjusting the position of said burners with respect to the path of the skelp.

2. Apparatus as claimed in claim 1, in which said carriage is mounted on said support for vertical movement, and said remote control means is operable to raise or lower said carriage with respect to the path of the skelp.

3. Apparatus as claimed in claim 1, in which said carriage is mounted on said support for horizontal movement, and said remote control means is operable to adjust the position of said carriage transversely with respect to the path of the skelp.

4. Apparatus as claimed in claim 1 in which said burners are mounted for tilting movement, and said remote control means is operable to incline the position of the burners with respect to the path of the skelp.

5. In apparatus for manufacturing pipe or tubing, a support, a carriage movably mounted on said support and carrying a pair of oppositely disposed burner heads for heating the edges of skelp, and a movable mounting for said support, whereby said support may be moved from operative position to a position spaced therefrom.

6. Apparatus as claimed in claim 5 in which said support comprises an overhead beam from which said carriage is suspended.

7. Apparatus as claimed in claim 5, in which said support comprises a pedestal, and said movable mounting comprises a truck on a turntable.

8. In apparatus for manufacturing pipe or tubing, a support, a carriage, burner heads on said carriage for heating the edges of skelp, a pair of links connecting said carriage to said support, means on said support for operating said links to adjust the position of said carriage with respect to the path of the skelp, a shaft connected to said operating means and extending to a remote position, and means at said remote position for actuating said shaft for operating said adjusting means.

9. In apparatus for manufacturing pipe or tubing, a support, a carriage mounted on said support, heads on said carriage for heating the edges of skelp, bearings on said carriage, means journaled in said bearings for mounting said heating heads on said carriage for tilting movement in vertical planes and comprising a lever, and means connected to said lever and extending to a remote position for inclining the position of said heating heads with respect to the path of said skelp.

10. In apparatus for manufacturing pipe or tubing, a burner for heating an edge of the skelp, means for movably supporting said burner, means for adjusting the position of said burner with respect to the path of the skelp, and means associated with said burner support for protecting said adjusting means from the heat of a furnace.

11. In apparatus for manufacturing pipe or tubing, means for heating an edge of skelp, means for adjusting the position of said heating means with respect to the path of said skelp, a control station spaced from said heating means, means at said control station for operating said adjusting means, means for removably supporting said heating means and said adjusting means, and means for disconnecting said control station operation means from said adjusting means to permit such removal.

12. In apparatus for manufacturing pipe or tubing from longitudinally moving skelp supported at longitudinally spaced positions so that such skelp travels from one support to the other while freely suspended therebetween, a carriage movably mounted with respect to said supports, skelp edge heating means adjustably mounted on said carriage, and remote control means for adjusting the position of said skelp edge heating means with respect to the freely suspended portion of the skelp.

13. In apparatus for manufacturing pipe or tubing from longitudinally moving skelp supported at longitudinally spaced positions by a furnace and a former so that such skelp travels from the furnace to the former while freely suspended therebetween, a carriage movably mounted with respect to the furnace and former, a plurality of skelp edge heating burners adjustably mounted on said carriage, and means for adjusting said skelp edge heating burners with respect to the freely suspended portion of the skelp.

14. In apparatus of the class described, a burner for heating an edge of a moving member, means for movably supporting said burner, means for adjusting the position of said burner with respect to the path of the member, a baffle adjacent said burner support, and means for cooling said baffle.

HARRY T. HERBST.

REFERENCES CITED

The following references are of record in the file of this patent:

UNITED STATES PATENTS

| Number | Name | Date |
|---|---|---|
| 1,616,861 | Laughlin, Jr. | Feb. 8, 1927 |
| 1,885,924 | Laughlin, Jr. | Nov. 1, 1932 |
| 2,327,318 | Rodder et al. | Aug. 17, 1943 |
| 1,941,184 | Oldham | Dec. 26, 1933 |
| 2,017,475 | Schmidt | Oct. 15, 1935 |
| 2,054,425 | Jones et al. | Sept. 15, 1936 |
| 2,030,842 | Anderson | Feb. 18, 1936 |
| 2,317,239 | Yoch | Apr. 20, 1943 |
| 2,196,902 | Jones | Apr. 9, 1940 |
| 1,176,584 | Madgett | Mar. 21, 1916 |

FOREIGN PATENTS

| Number | Country | Date |
|---|---|---|
| 82,922 | Switzerland | Apr. 1, 1920 |
| 434,498 | Germany | Sept. 23, 1926 |